United States Patent [19]

Ohtomo et al.

[11] Patent Number: 4,962,422
[45] Date of Patent: Oct. 9, 1990

[54] STEREOSCOPIC IMAGE DISPLAY APPARATUS

[75] Inventors: Fumio Ohtomo; Hiroyuki Frusho; Hitoshi Ohtani, all of Tokyo, Japan

[73] Assignee: Kabushiki Kaisha TOPCON, Tokyo, Japan

[21] Appl. No.: 363,763

[22] Filed: Jun. 9, 1989

[30] Foreign Application Priority Data

Jun. 23, 1988 [JP] Japan .................................. 63-153468
Jun. 23, 1988 [JP] Japan .................................. 63-153469

[51] Int. Cl.⁵ ...................... H04N 1/387; H04N 13/02
[52] U.S. Cl. ........................................ 358/88; 364/522
[58] Field of Search ................... 358/88, 109, 160; 364/522

[56] References Cited

U.S. PATENT DOCUMENTS 4,613,899  9/1986  Kuwano .................................. 358/88
4,805,015  2/1989  Copeland ............................... 358/88
4,908,705  3/1990  Wight ...................................... 358/109

Primary Examiner—Howard W. Britton
Attorney, Agent, or Firm—Ronald P. Kananen

[57] ABSTRACT

A stereoscopic image display apparatus for displaying left and right images on respective left and right monitors located at difference positions to provide a stereoscopic vision. The apparatus comprises a memory unit for storing information regarding the left image represented in a coordinate system and information regarding the right image represented in a coordinate system. The coordinate system of the left image is transformed to provide first transformed information regarding the left image represented in the transformed coordinate system. The coordinate system of the right image is transformed to provide second transformed information regarding the left image represented in the transformed coordinate system. The first transformed information regarding the left image is displayed on the left monitor. The second transformed information regarding the right image is displayed on the right monitor.

13 Claims, 10 Drawing Sheets

Fig. 9(a)    Fig. 9(b)
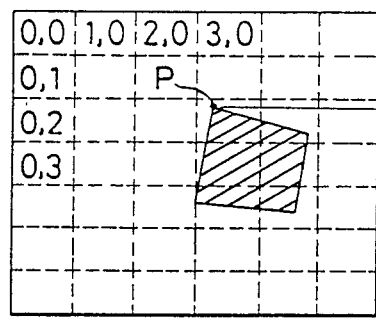 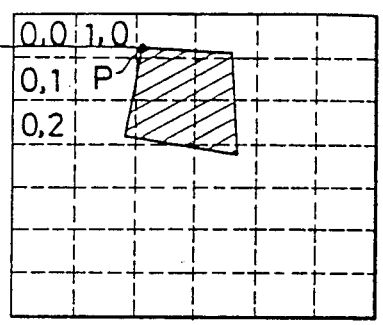
Fig. 9(c)    Fig. 9(d)
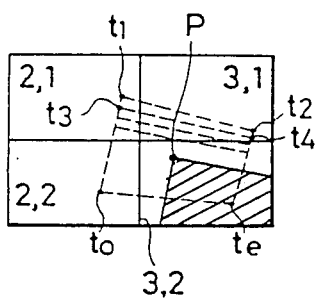 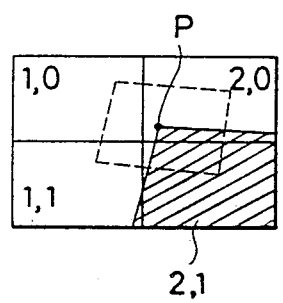
Fig. 9(e)    Fig. 9(f)
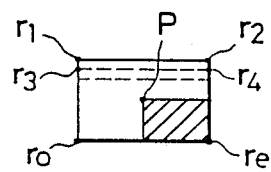 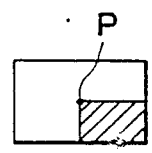

STEREOSCOPIC IMAGE DISPLAY APPARATUS

BACKGROUND OF THE INVENTION

This invention relates to a stereoscopic image display apparatus for displaying left and right images on respective left and right monitors located at different positions to provide a stereoscopic vision.

It is the current practice to provide a stereoscopic vision of an object by using a stereoscopic camera to take two photographs of the object. The stereoscopic camera has two cameras positioned in such a manner as to satisfy the requirements under which a stereoscopic vision of the object can be obtained with no correction on the two photographs taken by the stereoscopic camera. Such a stereoscopic camera is satisfactory for general application, but it has been found that its usefulness is limited in specialized applications, particularly where the distance of the object from the stereoscopic camera is within a limited range. For this reasons, an aerial survey has been made by the use of two photographs taken at different positions by a single camera. However, it is very difficult, if not impossible, to satisfy the requirements under which a stereoscopic view can be obtained by adjusting the direction of the camera positioned to take one of the two photographs and the direction of the camera positioned to take the other photograph. Stereoscopic image matching apparatus have been proposed in the art, but such prior apparatus have been found unsatisfactory.

SUMMARY OF THE INVENTION

It is a primary object of the present invention to provide a stereoscopic image display apparatus which can correct left and right image information to provide a good stereoscopic vision.

There is provided, in accordance with the invention, a stereoscopic image display apparatus for displaying left and right images on respective left and right monitors located different positions to provide a stereoscopic vision. The apparatus comprises memory means for storing information regarding the left image represented in a coordinate system and information regarding the right image represented in a coordinate system, and image transforming means for transforming the coordinate system of the left image to provide first transformed information regarding the left image represented in the transformed coordinate system and the coordinate system of the right image to provide second transformed information regarding the left image represented in the transformed coordinate system. Display means is provided for displaying the first transformed information regarding the left image on the left monitor and the second transformed information regarding the right image on the right monitor.

In one aspect of the invention, the memory means includes means for storing information regarding an array of two-dimensional left image segments forming the left image and information regarding an array of two-dimensional right image segments forming the right image.

In another aspect of the invention, the image transforming means includes first and second buffer memories. The first buffer memory stores information transferred thereto from the memory means, the transferred information regarding an array of adjacent left image segments forming a portion of the left image having a first specified data point. The second buffer memory stores information transferred thereto from the memory means, the transferred information regarding an array of adjacent right image segments forming a portion of the right image having a second specified data point corresponding to the first data point.

In still another aspect of the invention, the image transforming means includes means for extracting information from the information stored in the first buffer memory, the extracted information regarding pixels included in a specified area of the information having the first data point at the center of the specified area. The image transforming means also includes means for extracting information from the information stored in the second buffer memory, the extracted information regarding pixels included in a specified area of the information having the second data point at the center of the specified area.

In still another object of the invention, the image transforming means includes first and second image memories. The first image memory stores the extracted information transferred thereto from the first buffer memory to form the first transformed information regarding an array of pixels having the first data point at the center of the array. The second image memory stores the extracted information transferred thereto from the second buffer memory to form the second transformed information regarding an array of pixels having the second data point at the center of the array.

In a further aspect of the invention, the display means includes marking means for displaying at least one first measure mark at a given first position on the first transformed information and at least one second measure mark at a second position on the second transformed information. The second position corresponds to the first position.

BRIEF DESCRIPTION OF THE DRAWINGS

This invention will be described in greater detail by reference to the following description taken in connection with the accompanying drawings, in which like reference numerals refer to the same parts, and wherein:

FIGS. 9(a) to 9(f) are diagrams used in explaining another example of image transformating process performed in the stereoscopic image display apparatus.

DETAILED DESCRIPTION OF THE INVENTION

Figure 1:
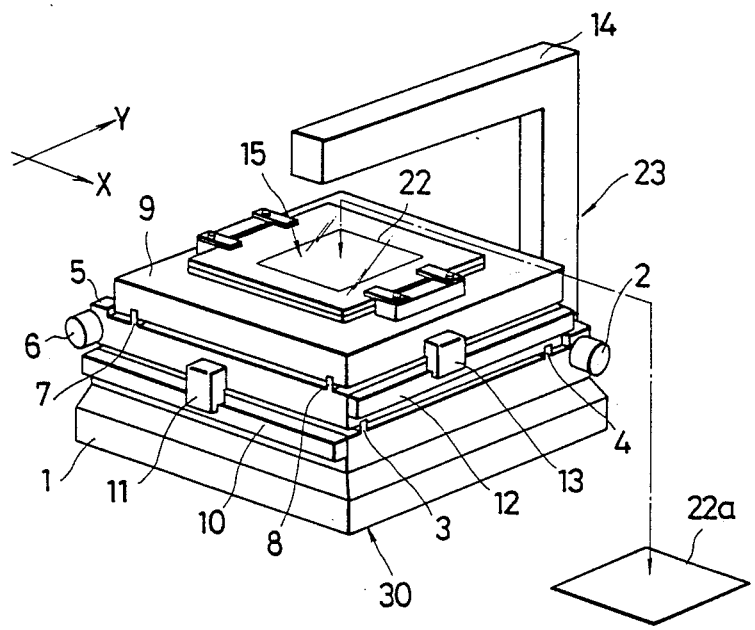
FIG. 1 is a perspective view of a document table included in an image input apparatus which may be used with the invention.

With reference to the drawings, wherein like numerals refer to like parts in the several views, and in particular to FIG. 1, there is shown a document table with which the present invention may be employed. The document table includes a base 1. The base 1 carries a carriage 5 which is slidable along guide rails 3 and 4 formed on the base 1. This back and forth motion of the carriage 5 is here termed movement along X axis. To produce this motion of the carriage 5 along the X axis, an X feed motor 2 is provided. The X position of the carriage 5 along the X axis is sensed by an X position sensor 11 fixed on the carriage 5, the X position sensor being associated with a linear encoder 10 fixed on the base 1. With movement of the carriage 5 along the X axis, the X position sensor 11 moves with respect to the linear encoder 10. Then the X position sensor produces a series of pulses, the number of which corresponds to the X-axis displacement of the carriage 5 from its initial position.

The carriage 5 carries a cross slide 9 which is slidable along guide rails 7 and 8 formed on the carriage 5. This motion is here termed movement along Y axis. To produce this motion of the cross slide 9 along the Y axis, a Y feed motor 6 is provided. The Y position of the cross slide 9 along the Y axis is sensed by a Y position sensor 13 fixed on the cross slide 9, the Y position sensor 13 being associated with a linear encoder 12 fixed on the carriage 5. With movement of the cross slide 9 along the Y axis, the Y position sensor 13 moves with respect to the linear encoder 12. Then the Y position sensor produces a series of pulses, the number of which corresponds to the Y-axis displacement of the cross slide 9 from its initial position.

A film holder 15 is fixed on the cross slide 9 with no showing screws. Thus, movement of the carriage 5 on the base 1 and movement of the cross slide 9 on the carriage 5 can produce motion of the film holder 15 in the X- and Y-axis directions at right angles. The film holder 15 holds an image source of a photographic film. The document table is used for two photographic films 22 and 22a taken at different positions by a single camera. The image on the photographic film is projected by an image projector onto an image sensor to be described later. The image projector comprises a lighting section 23 contained in a hollow arm 14 secured on the base 1, and an image focusing section 30 contained in the base 1.

Figure 2:
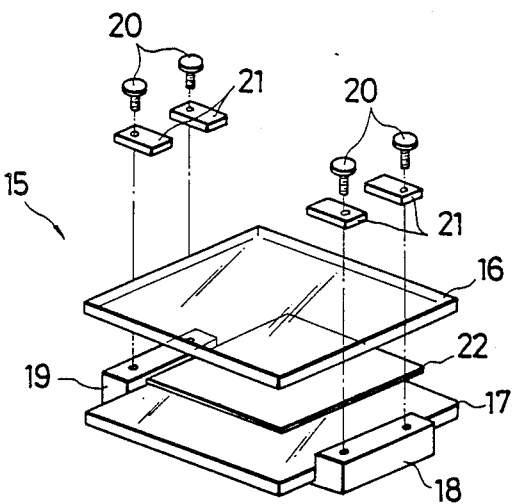
FIG. 2 is a perspective view showing the film holder used in the document table of FIG. 1.

Referring to FIG. 2, the film holder 15 comprises a pair of glass plates 16 and 17, two mounting blocks 18 and 19, and a clamping means. The clamping means includes a pair of clamping plates 21 detachably secured, by means of respective bolts 20, to the mounting block 18 and another pair of clamping plates 21 likely secured, to the mounting block 19. With this structure of the film holder 15, the photographic film 22, which is sandwiched between the glass plates 16 and 17, can be fixed securely without a slack etc.

Figure 3:
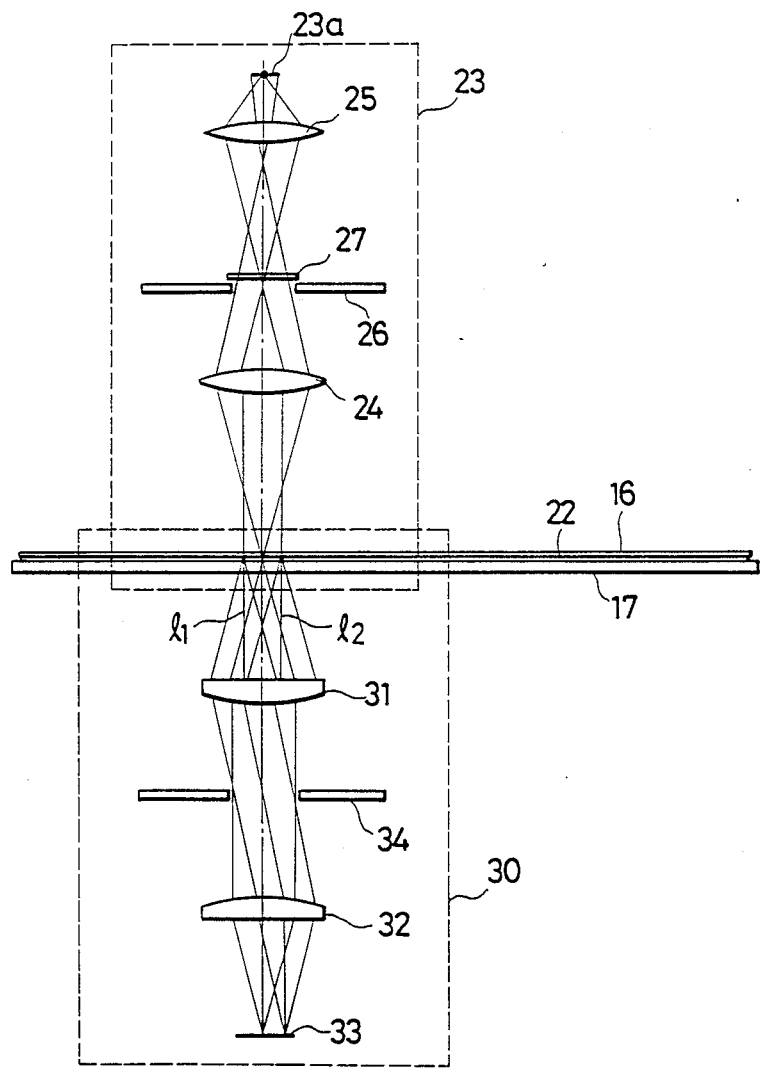
FIG. 3 is a side view showing the image projector contained in the document table.

Referring to FIG. 3, the lighting section, generally designated by the numeral 23, comprises a lamp 23a, a combination of lenses 24 and 25, and an aperture diaphragm 26 provided at the focal point of the lens 25 which is located at a position providing a conjugate relationship between the lamp 23a and the focal point of the lens 24 to provide uniform lighting on a limited area of the photographic film 22. The light generated by the lamp 23a is collimated by the lens combination and directed toward the limited area of the photographic film 22. A diffusing plate 27 is provided adjacent to the aperture diaphragm 26 in order to ensure the uniform lighting on the photographic film 22.

The image focusing section, generally designated by the numeral 30, comprises a combination of lenses 31 and 32, and an aperture diaphragm 34 provided at the focal point of the lens 31. The lenses 31 and 32 are identical lenses located to form a symmetrical arrangement so as to eliminate distortions and other asymmetrical aberrations. The image on the limited area of the photographic film 22 is projected through the lens combination onto a solid state image sensor 33 such as an area charge coupled device (CCD). With such a one-magnification telecentric optical system, the principal rays 11, 12, ... are parallel to the optic axis. Thus, the size of the image focused on the image sensor 33 is unaffected by variations in the distance between the photographic film 22 and the lens 31. It means that the size of the image projected on the image sensor 33 is independent on the refractive index and thus the thickness of the glass plate 17.

While the image projector has been shown and described in connection with a transmission system, it is to be appreciated, of course, that the image projector may be taken in the form of a refractive system. In this case, only the plate 17 may be a glass plate.

Figure 4:
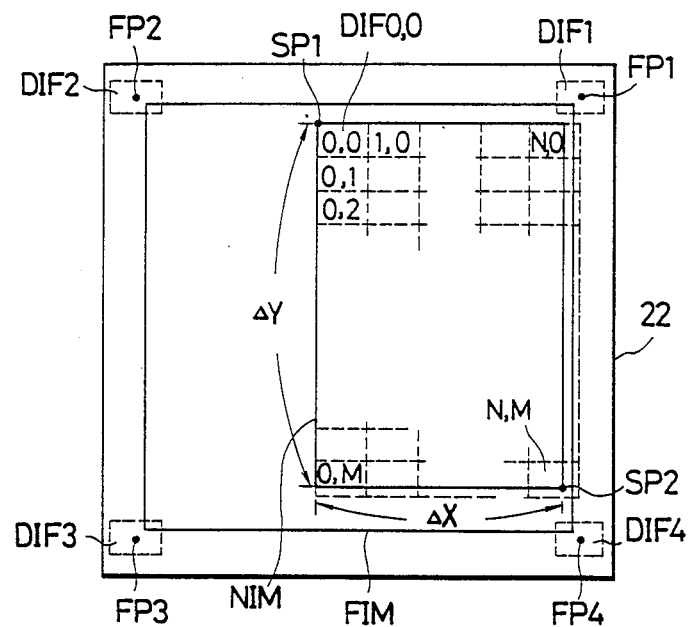
FIG. 4 is a plan view used in explaining necessary data to be converted into digital information.

Referring to FIG. 4, the photographic film 22 is taken in the form of an aerial photography film having an image area FIM surrounded by a frame having areas DIF1, DIF2, DIF3 and DIF4 with respective "Fiducial mark" FP1, FP2, FP3 and FP4. Assuming now that the necessary information is included on a portion NIM in the image area FIM, this information is required to be inputted along with the "Fiducial image" DIF1, DIF2, DIF3 and DIF4. Since the "Fiducial mark" FP1, FP2, FP3 and FP4 are at predetermined positions on the frame, it is possible to input the "Fiducial image" DIF1, DIF2, DIF3 and DIF4 by inputting, through face to face communication with a digital computer, data approximately specifying the coordinates of the respective "Fiducial mark" FP1, FP2, FP3 and FP4 or by programming the digital computer to input these "Fiducial image" automatically at the start of the image input operation. In this case, it is required to set the photographic film 22 in place on the film holder 15. This requirement can be satisfied merely by providing positioning marks on the film holder 15. The necessary image area NIM is specified by points SP1 and SP2 on the diagonal corners of the area NIM. The necessary image area NIM is divided into an $M+1\times N+1$ array of two-dimensional image segments. Each of the image segments can be represented by its coordinates. In two dimensions the coordinates can be specified as the elements of a column, row matrix [x,y]. The information on these image segments is inputted in a predetermined sequence, for example, S(0,0), ... S(N,0), (0,1), ... S(N,M).

Figure 5:
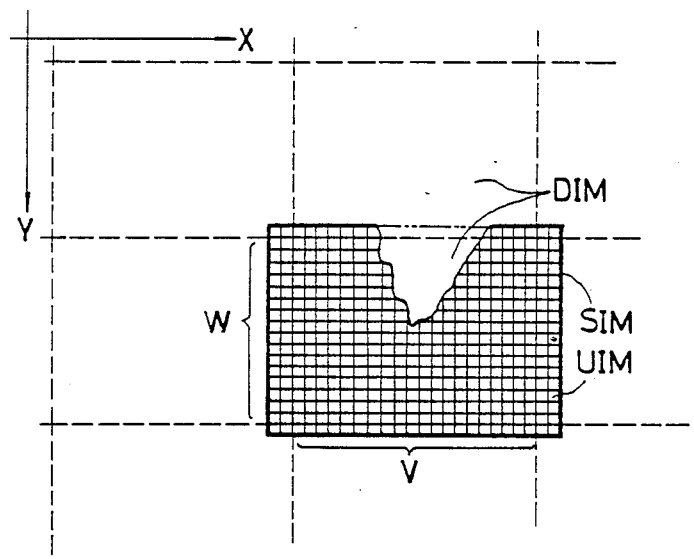
FIG. 5 is a plan view used in explaining the position of the image sensor with respect to an image segment to be converted.

Referring to FIG. 5, the image sensor 33 has a photosensitive surface SIM of a predetermined size including a $V\times W$ array of pixels UIM which form image information regarding one image segment. These pixels are arranged along X and Y axes. The necessary image area is divided into an array of two-dimensional image segments DIM arranged along the X and Y axes. The X axis is parallel to the horizontal direction of the photosensitive surface of the image sensor 33 and also to the direction of movement of the carriage 5. The Y axis is parallel to the vertical direction of the photosensitive surface of the image sensor 33 and also to the direction of movement of the cross slide 9. The image segments have a size smaller than the size of the photosensitive surface SIM of the image sensor 33. The image segments DIM have a width which raise the distance between adjacent two pixels to the nth power and a length which integral of the distance between adjacent two pixels to the nth power for a simple minifying operation. The image source 22 is held in a fixed position with respect to the image sensor 33, as shown in FIG. 5, when a selected one of the image segments DIM is converted into digital form. The image source 22 is moved to bring the image segments DIM in a predetermined sequence to the fixed position.

Figure 6:
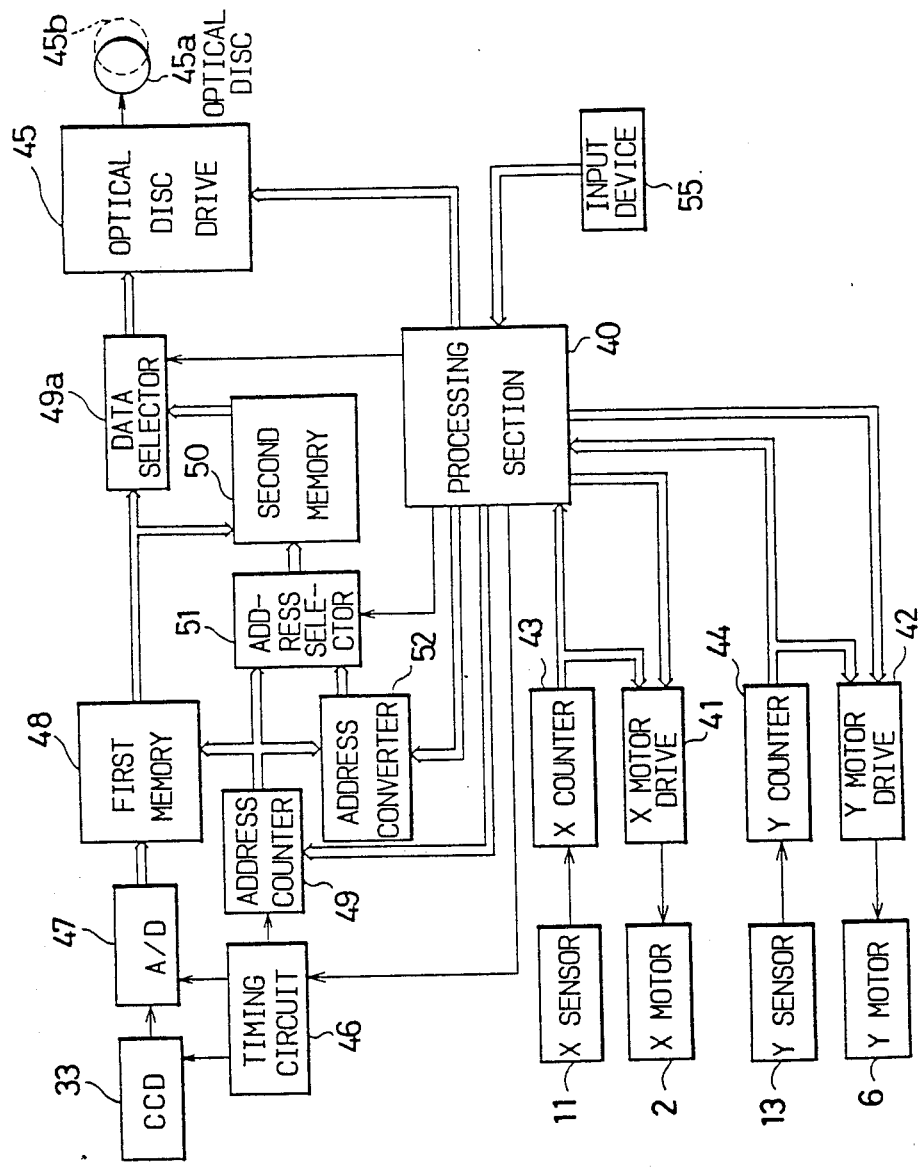
FIG. 6 is a block diagram showing an electric circuit used in the image input apparatus.

Referring to FIG. 6, the X motor 2 and the X position sensor 11 constitute an X servo system together with an X motor drive circuit 41 and an X counter 43. Similarly, the Y motor 6 and the Y position sensor 13 constitute a Y servo system together with a Y motor drive circuit 42 and a Y counter 44. The X and Y servo systems are controlled by a processing section 40. The processing section 40 calculates required values for the X and Y positions of the document table based on a demand inputted thereto through an input device 55. The calculated X position value is transferred from the processing section 40 to the X motor drive circuit 41 which thereby operates the X motor 2 to move the carriage 5 along the X axis. The X counter 43 counts pulses generated from the X position sensor 11. Thus, the X counter 43 accumulates a count corresponding to the actual X position of the carriage 5 with respect to its initial position. The count of the X counter 43 is transferred to the X motor drive circuit 41. The X motor drive circuit 41 stops the X motor 2 when the count of the X counter 43 coincides with the calculated X position value transferred thereto from the processing section 40. At the same time, the calculated Y position value is transferred from the processing section 40 to the X motor drive circuit 42 which thereby operates the Y motor 6 to move the cross slide 9 along the Y axis. The Y counter 44 counts pulses generated from the Y position sensor 13. Thus, the Y counter 44 accumulates a count corresponding to the actual Y position of the cross slide 9 with respect to its initial position. The count of the Y counter 44 is transferred to the Y motor drive circuit 42. The Y motor drive circuit 42 stops the Y motor 6 when the count of the Y counter 44 coincides with the calculated Y position value transferred thereto from the processing unit 40. The counts of the X and Y counters 43 and 44 are transferred also to the processing section 40 which transfers them to an optical disc drive 45 for storing these counts into a random access memory in the form of an optical disc 45a as required.

The image sensor 33, which carries a V×W array of pixels forming the information regarding one image segment projected on its photosensitive surface, converts light energy on a pixel into a corresponding electric signal in response to each of timing pulses generated from a timing circuit 46. This conversion is made repetitively for all of the pixels in a predetermined order, for example, left-to-right and top-to-bottom. This electric signal is applied to an analog-to-digital converter 47 which converts it into digital form for application to a first memory 48. The timing pulse is applied from the timing circuit 46 to the analog-to-digital converter 47 so as to synchronize this conversion with the conversion of the image sensor 33. The timing pulse is also applied to an address counter 49 which counts the timing pulses generated from the timing circuit 46 and accumulates a count indicative of the x (column) and y (row) address corresponding to the position of the pixel converted. For this purpose, the address counter 49 includes x and y counters. The x counter increments once each time a timing pulse is generated from the timing circuit 46. The x counter generates a carry for every a predetermined number, in this case V, of timing pulses. The y counter increments once each time a carry is generated from the x counter. The y counter is cleared after it counts a predetermined number, in this case W of carrys. The numbers V and W, which corresponds to the effective memory section of the first memory 48, are changed on a command fed from the processing section 40 to the address counter 49. The count of the address counter 49 is transferred to permit the first memory 48 to store the digital signal at a location specified by the x and y coordinates.

The information regarding the image segment are transferred from the first memory 48 to a second memory 50 and also through a data selector 49a to a random access memory in the form of an optical disc 50. This transferring operation is made on a command fed to the timing circuit 46 from the processing section 40. The function of the data selector 49a is to selectively connect one of the first and second memories 48 and 50 to the optical disc drive 45 on a command fed thereto from the processing unit 40.

The second memory 50 is used to form a sampled image to which the image segment is minified at a predetermined minification coefficient. The secondary memory 50 is connected through an address selector 51 to an address converter 52 which serves to address the second memory 50.

A value of one of each of 16×16 arrays of pixels may be sampled to form the sampled image. Also, the sampled image may be formed by averaging the value of each of 16×16 arrays of pixels, for example. The former operation will be explained for the simplification purpose.

The address selector 51 sends an output signal to the secondary memory 50 according to a command signal from the processing unit 40. The address converter 52 serves to address the secondary memory 50 for obtaining the sampled image. That is, the address converter 52 can operate in such a manner that an output count value from the address counter 49 is multiplied by a sampling coefficient and then the output count value added to an initial address count in the processing unit 40 is output.

Assuming now that the sampling coefficient set is 16 and the initial x and y address counts set are 0,0 (row address, column address), the output count value of the address converter 52 increments once from the initial count 0,0 (row address, column address) in a sequence when each time the output count value of the address counter 49 increments 16 times. That is, the information regarding the image segment is sequentially supplied from the first memory 48 to the second memory 50 according to the information regarding the address counter 49. The output counts from the address converter 52 are the same in the micro image area specified by the 16×16 arrays of pixels. Therefore, the information regarding the last pixel transferred from the micro image area is stored in the secondary memory 50. Accordingly, the secondary memory 50 stores the information regarding the image segment sampled to 1/16 when all of the information regarding the image segment is transferred.

The sampled image segment is stored in the predetermined position of the secondary memory 50. The initial address of the predetermined position is the initial address provided by the processing unit 40.

Incidentally, the image segment may be also sampled to 1/16 by shifting the output of the address counter 49 four bits toward the least significant bit portion.

The digital information regarding the image segment is transferred from the first memory 48 through the optical disc drive 45 to the optical disc 45a as required. The optical disc 45a stores the digital information regarding the image segment including the location thereof relative to the X and Y axes each time digital information regarding an image segment is transferred thereto. Accordingly, the optical disc 45a stores the digital information for all of the image segments including the respective locations thereof relative to the X and Y axes to form information regarding the necessary image portion. The digital information regarding the image segment is also transferred from the first memory 48 to the second memory 50. The second memory 50 stores minified information regarding the image segment.

Each time the digital information of an image segment is transferred to the optical disc 45a, the minified information regarding to the image segment is formed in the second memory 50. The minified information regarding all of the image segments is transferred from the second memory 50 to the optical disc 45a on a command produced from the processing section 40 when the digital information regarding all of the image segments is transferred to the optical disc 45a. The minified information regarding to an image segment stored in the optical disc 45a may be used as an index for the image segment.

The operation is as follows: The operator inputs a minification coefficient (in this case 16) and data points SP1 and SP2 (FIG. 4) through the input device 55 to the processing section 40, these data points SP1 and SP2 being represented as coordinate pairs $(X_1, Y_1)$ and $(X_2, Y_2)$. The processing section 40 calculates the width $\Delta X$ of the necessary portion of the image area as $\Delta X = X_2 - X_1$ and the length $\Delta Y$ thereof as $\Delta Y = Y_2 - Y_1$. The processing section 40 then calculates the number n of the image segments arranged along the X axis by dividing the width $\Delta X$ by the width of each of the image segments and the number m of the image segments arranged along Y axis by dividing the length $\Delta Y$ by the length W of each of the image segments (wherein $n = N + 1$, $m = M + 1$).

The processing section 40 calculates values for the X and Y positions of the document table at which the image segment (0,0) is at the fixed position with respect to the image sensor 33. The calculated X position value is transferred to the X motor drive circuit 41 which thereby operates the X motor 2 to move the carriage 5 along the X axis. The X motor stops when the count of the X counter 43 coincides with the calculated X position value transferred thereto from the processing section 40. Similarly, the calculated Y position value is transferred from the processing section 40 to the Y motor drive circuit 42 which thereby operates the Y motor 6 to move the cross slide 9 along the Y axis. The Y motor 6 stops when the count of the Y counter 44 coincides with the calculated Y position value transferred thereto from the processing section 40.

When the image segment (0,0) is held at the fixed position with respect to the image sensor 33, it is projected onto the photosensitive surface of the image sensor 33 which thereby convert into the electric signal. Then its signal is transferred through the analog-to-digital converter 47 into the first memory 48.

The processing unit 40 makes calculations of $(V \times n)/16$ and $(W \times m)/16$ to provide initial x' and y' (addresses for the minified information regarding the respective image segments). The calculated initial address values are transferred to the address converter 52. When the processing section 40 produces a command to the data selector 49a, the digital information regarding the image segment (0,0) is transferred from the first memory 48 through the optical disc drive 45 to the optical disc 45a. At this time, the second memory 50 stores the minified information regarding to the image segment (0,0) formed therein. In this case, the counts of the X and Y counters 43 and 44 may be transferred to optical disc 45 in order to ensure the position of the image. This sequence is repeated for each of the image segments into which the necessary image area is divided. Upon completion of the sequence for the last image segment (N,M), the optical disc 45a stores the information regarding all of the image segments and the second memory 50 stores the minified information regarding all of the image segments. When the processing unit 40 produces a command to the data selector 49a, the minified information is transferred from the second memory 50 through the optical disc drive 45 to the optical disc 45a. The complete sequence will be repeated for the photographic film 22a. The digital information for the photographic film 22a is stored through the optical disc drive 45 into an optical disc 45b.

The image input apparatus is arranged to read only image information regarding a necessary portion of the image area. Thus, it is possible to reduce the required number of memory sections and the time required to read, write and transfer the information to a considerable extent. The image input apparatus of the invention is arranged to read image information for each of the image segments into which the necessary image area is divided. This arrangement is effective to reduce the required capacity of the computer memory and the required computer operation time to a great extent. The image input apparatus of the invention is arranged to employ a solid state image sensor for converting one of the image segments into an electric signal. This image sensor requires a small area on which the image is projected. Therefore, this arrangement is free from the influence of lens distortions. In addition, since the image sensor and the image source are held stationary when the image information regarding one image segment is read. Therefore, this arrangement is free from the influence of vibrations.

Figure 7:
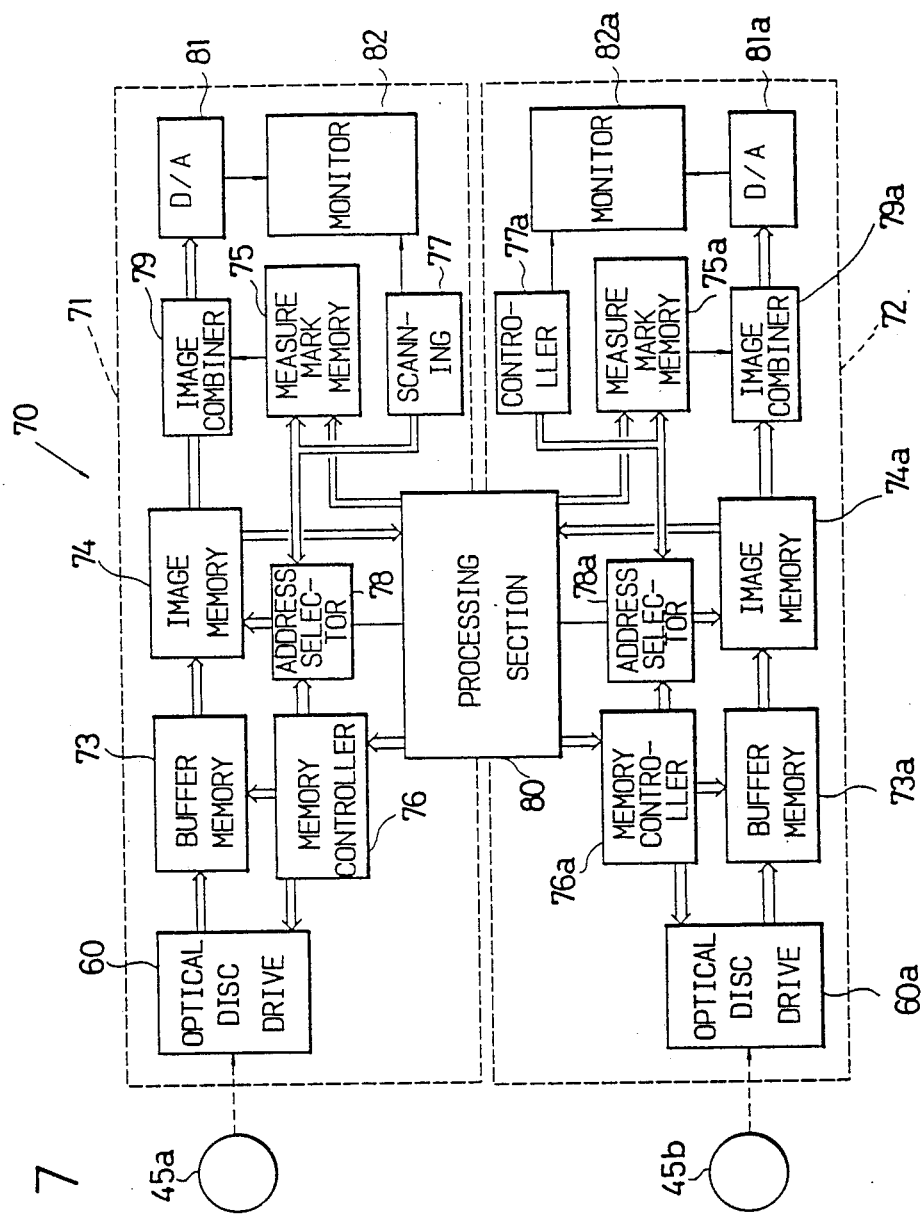
FIG. 7 is a block diagram showing one embodiment of a stereoscopic image display apparatus made in accordance with the invention.

Referring to FIG. 7, the stereoscopic image display apparatus, generally designated by the numeral 70, comprises a processing section 80 for controlling left and right image display units 71 and 72. The right image display unit 72 is substantially identical to the left image display unit 71. Accordingly, elements in the right image display unit 71 which correspond to those in the left image display unit 71 are identified by the same reference numerals, only with a small a affixed thereto. A detailed description for the right image display unit 72 will be omitted to avoid duplicity.

It is now assumed that the optical disc 45a stores the left image information regarding to all of the necessary image segments of the left image source 22 including the respective locations thereof relative to the X and Y axes and the optical disc 45b stores the right image information regarding all of the necessary image segments of the right image source 22a including the respective locations thereof relative to the X and Y axes. The optical discs 45a and 45b are set in respective optical disc drives 60 and 60a for reading or writing image information.

The left image display unit 71 comprises an image transforming section, controlled by the processing section 80, for transforming the coordinate system of the left image to provide transformed information regarding the left image represented in the transformed coordinate system. The image transforming section includes a buffer memory 73, an image memory 74, and a memory controller 76. The buffer memory 73 is divided into a predetermined number of (in this case four) memory sections each storing information regarding one image segment. The memory controller 76 addresses the optical disc drive 60 and the buffer memory 73 on a command from the processing unit 80 for transferring image information from the optical disc drive 60 to the buffer memory 73. The buffer memory 73 stores information transferred thereto from the optical disc drive 60. The information stored in the buffer memory 73 regards an array of adjacent four left image segments forming a portion of the left image.

The image memory 74 is divided into a predetermined number of memory sections each storing pixel information regarding one pixel. The memory controller 76 addresses the buffer memory 73 and the image memory 74 through an address selector 78, on a command from the processing section 80 for transferring information from the buffer memory 73 to the image memory 74. The information transferred from the buffer memory 73 regards pixels included in a specified area extracted from the information stored in the buffer memory 73. The image memory 74 stores pixel information in a predetermined sequence, for example, from left-to-right and from top-to-bottom. The information stored in the image memory 74 regards a rectangular array of pixels. The stored information is the result of transformation of coordinate system of the transferred information to satisfy the requirements under which a stereoscopic vision can be obtained. For this purpose, the processing section 80 specifies a first pair of X and Y addresses identifying a location from which pixel information regarding a pixel is transferred from the buffer memory 73 and a second pair of X and Y addresses identifying a location at which the transferred pixel information is stored in the image memory 74. The processing section 80 calculates the first pair of X and Y addresses from an equation for transforming the coordinate system of the left image to the transformed coordinate system. This equation defines the first pair of X and Y addresses as a function of the second pair of X and Y addresses. The equation may be a perspective projection equation employing perspective projection factors. These perspective projection factors are obtained from the relative orientation of the central projection. The term "relative orientation" means the angle at which the direction of a camera set to take one of the two photographs is inclined with respect to the direction of the camera set to take the other photograph.

Figure 8A:
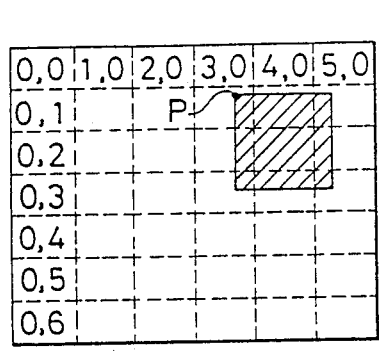
FIGS. 8(a) to 8(d) are diagrams used in explaining one example of image transformating process performed in the stereoscopic image display apparatus.
Figure 8B:
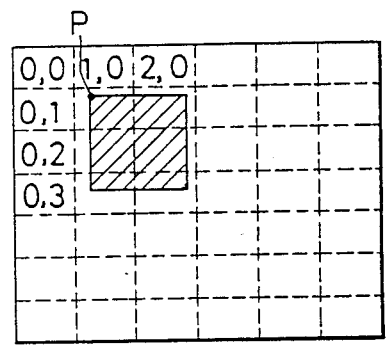

The operation of the image transforming section will be described with reference to FIGS. 8 and 9. FIG. 8(a) illustrates digital information regarding a left image stored in the optical disc 45a, and FIG. 8(b) illustrates digital information regarding a right image stored in the optical disc 45b. In the illustrated case, the left and right images which are formed on respective photographic films 22 and 22a by a stereoscopic camera having two cameras used to take photographs of one square side surface of a cubic object with their optical axis being directed in a direction perpendicular to the square side surface. Each of the left and right images is divided into a 6×7 array of image segments. In FIGS. 8(a) and 8(b), the character P indicates specified data points on the left and right images corresponding to a point on the square side surface.

It is now assumed that the position of the data point P is obtained. The processing section 80 produces a command causing the memory controller 76 to transfer the information regarding the image segment (3,1) including the data point P and the information regarding the adjacent image segments (3,0), (4,0) and (4,1) in a predetermined sequence, for example, in the order of (3,0), (4,0), (3,1) and (4,1), from the optical disc drive 60 to the buffer memory 73 and a command causing the memory control section 76a to transfer the information regarding the image segment (1,1) including the data point P and the information regarding the adjacent image segments (0,0), (1,0) and (1,1) in a predetermined sequence, for example, in the order of (0,0), (1,0), (0,1) and (1,1), from the optical disc drive 60a to the bufer memory 73a.

Figure 8C:
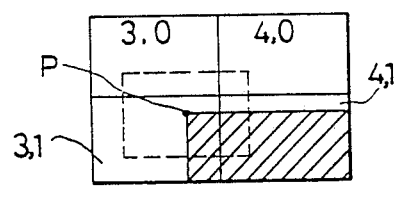
Figure 8D:
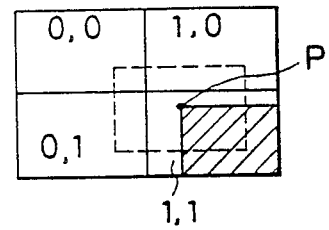

FIG. 8(c) illustrates the digital information regarding the four adjacent image segments stored in the buffer memory 73, and FIG. 8(d) illustrates the digital information regarding the four adjacent image segments stored in the buffer memory 73a.

The processing section 80 then produces an image transformation (combining/extracting transformation) command causing the memory control section 76 to transfer image information from the buffer memory 73 to the image memory 74. This image transformation command includes X and Y addresses of the location from which image information is transferred to the image memory 74, these X and Y addresses being applied through the memory control section 76 to address the buffer memory 73, and X and Y addresses of the location at which the transferred image information is stored in the image memory 74, these X and Y addresses being applied through the memory control section 76 to address the image memory 74. The image transformation command is repetitively produced from the processing section 80 to permit the image memory 74 to store the transferred image information serialized from left-to-right and from top-to-bottom to form image information regarding a specified area comprised of a two-dimensional array of pixels. The processing section 80 specifies this area in such a manner that the data point P is located at the center of the area. Thus, the combining/extracting transformation of the adjacent image segments is performed so as to display a point P regarding the right image on the center of the right monitor and a point P regarding the left image on the center of the left monitor.

While the memory control section 76 is normally arranged to transfer image information from the buffer memory 73 in a sequence from left-to-right and from top-to-bottom, it may be arranged to carry out this image information transfer in a sequence directed at an angle with respect to the direction of the width of the array of pixels contained in the specified area. In this case, the X and Y address counters of the memory control section 76 are incremented at respective rates which can be changed on commands fed thereto from the processing section 80.

FIG. 9(a) illustrates digital information regarding a left image stored in the optical disc 45a, and FIG. 9(b) illustrates digital information regarding a right image stored in the optical disc 45b. In the illustrated case, the left image is formed on a photographic film 22 by a camera set at a position to take a photograph of a square side surface of a cubic object, and the right image is formed on another photographic film 22a by the camera set at another position to take a photograph of the square side surface. The left and right images are distorted, as shown in FIGS. 9(a) and 9(b). It is impossible as they are to provide a stereoscopic vision to a person particularly when a great y-parallax HD exists, as shown in FIGS. 9(a) and 9(b).

The processing section 80 produces a command causing the memory control section 76 to transfer the information regarding the image segment (3,2) including the data point P and the information regarding the adjacent image segments (2,1), (3,1) and (2,2) in a predetermined sequence, for example, in the order of (2,1), (3,1), (2,2) and (3,2), from the optical disc drive 60 to the buffer memory 73 and a command causing the memory control section 76a to transfer the information regarding the image segment (2,0) including the data point P and the information regarding the adjacent image segments (1,0), (1,1) and (2,1) in a predetermined sequence, for example, in the order of (1,0), (2,0), (1,1) and (2,1), from the optical disc drive 60a to the buffer memory 73a.

FIG. 9(c) illustrates the digital information regarding the four adjacent image segments stored in the buffer memory 73, and FIG. 9(d) illustrates the digital information regarding the four adjacent image segments stored in the buffer memory 73a. FIG. 9(e) illustrates the digital information stored in the image memory 74, and FIG. 9(f) illustrates the digital information stored in the image memory 74a.

The processing section 80 then produces an image transformation (coordinate system transformation) command causing the memory control section 76 to transfer image information from the buffer memory 73 to the image memory 74. This image transformation command includes X and Y addresses of the location (t1) from which image information is transferrred to the image memory 74, these X and Y addresses being applied through the memory controller 76 to address the buffer memory 73, and X and Y addresses of the location (r1) at which the transferred image information is stored in the image memory 74, these X and Y addresses being applied through the memory controller 76 to address the image memory 74. The image transformation command is repetitively produced from the processing section 80 to permit the image memory 74 to store the transferred image information serialized from left-to-right and from top-to-bottom to form image information (FIG. 9(e)) regarding a specified rectangular this area. The transformed left and right images stored in the respective image memories 74 and 74a, which have no distortion and no y-parallax, as shown in FIGS. 9(e) and 9(f), can provide a stereoscopic vision. For this purpose, the processing section 80 employs a perspective projection equation to calculate the X and Y addresses of the data points t1, t2, t3, t4, . . . , to and te which correspond to the X and Y addresses of the respective data points r1 r2, r3, r4, . . . , ro and re of the image information (FIG. 9(e)) regarding the specified rectangular area stored in the image memory 74, the stored image area including the data point P located at the center of the image area. The X and Y addresses of data points lying on each of the lines t1–t2, t3–t4, . . . , to–te can be calculated easily from the X and Y addresses of the respective data point pairs t1 and t2, t3 and t4, . . . , to and te.

Figure 10:
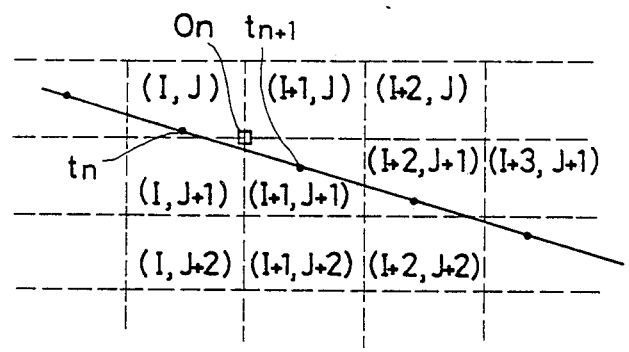
FIG. 10 is a diagram used in explaining one example of pixel information weighting process performed in the stereoscopic image display apparatus.

While pixel information may be transferred from the buffer memory 73 to the image memory 74 as it is, it is preferable to provide an improved stereoscopic vision by weighting the pixel information. For example, as shown in FIG. 10, the pixel information $P(I,J)$ stored at a location $(I,J)$ may be weighted as $P(I,J) = K1 \times P(I,J) + K2 \times P(I+1,J) + K3 \times P(I,J+1) + K4 \times P(I+1,J+1)$, where $K1$, $K2$, $K3$ and $K4$ indicate the weights determined by the distance of the respective locations $(I,J)$, $(I+1,J)$, $(I,J+1)$ and $(I+1,J+1)$ with respect to the location tn lying on one of the lines t1–t2, . . . , and to–te.

While both of the left and right images are required to be transformed with the use of a perspective projection technique employing perspective projection factors obtained from the relative orientation of the central projection, it is to be appreciated that only one of the left and right images may be transformed if the image transformation is made on the basis of the other image. It is to be appreciated that the like image transformating process may be applied for the sampled image information. In addition, it is to be appreciated that a single image transforming section may be used for transforming both of the left and right images.

Returning to FIG. 7, the transformed image information is transferred to an image combiner 79 where it is combined with marking information transferred from a measure mark memory 75. The measure mark memory 75 may be divided into the same number of memory sections as the image memory 74. The marking information includes information regarding one measure mark which may be located at a position corresponding to the data point P. Alternatively, the marking information includes information regarding measure marks which may be arranged to form the contour line of the image. The content of the measure mark memory 75 can be changed on a command from the processing section 80 through fact-to-face communication. The positions of the measure marks stored in the measure mark memory 75 correspond to the positions of the respective measure marks stored in the measure mark memory 75a.

A scan controller 77 addresses the measure mark memory 75 and the image memory 74 through the address selector 78 to transfer the transformed image information in a predetermined sequence, for example, from left-to-right and from top-to-bottom from the image memory 74 to the image combiner 79 and transfer the marking information in the same sequence, for example, from left-to-right and from top-to-bottom from the measure mark memory 75 to the image combiner 79. The address selector 78 selectively couple one of the memory controller 76 and the scan controller 77 on a command from the processing section 80. The combined information is transferred from the image combiner 79 to a digital-to-analog converter 81 which converts the combined image information into analog form for application to a monitor 82. The monitor 82 displays the combined image in response to synchronizing signals fed thereto from the scan controller 77.

In order to provide a stereoscopic vision of the object, the left and right images displayed on the respective monitors 82 and 82a are viewed through a polarized filter and a half mirror. Since the object is viewed with its left and right sides reversed under this condition, the scan controllers 77 and 77a are arranged to make their scanning operations in the opposite directions. Alternatively, the information may be transferred from the buffer memory 73 to the image memory 74 in a sequence opposite to the sequence in which the information is transferred from the buffer memory 73a to te image memory 74a. The image transforming means is used for transforming the coordinate system of the left image to provide first transformed information regarding the left image represented in the transformed coordinate system and the coordinate system of the right image to provide second transformed information regarding the left image represented in the transformed coordinate system. The object of the image transformation is to reduce the y-parallax.

While the invention has been described in conjunction with a specific embodiment thereof, it is evident that many alternatives, modifications and variations will be apparent to those skilled in the art. Accordingly, it is intended to embrace all alternatives, modifications and variations that fall within the scope of the appended claims.

What is claimed is:

1. A stereoscopic image display apparatus for displaying left and right images on respective left and right monitors located at different positions to provide a stereoscopic vision, comprising:

memory means for storing information regarding the left image represented in a coordinate system and information regarding the right image represented in a coordinate system;

image transforming means for transforming the coordinate system of the left image to provide first transformed information regarding the left image represented in the transformed coordinate system and the coordinate system of the right image to provide second transformed information regarding the left image represented in the transformed coordinate system; and display means for displaying the first transformed information regarding the left image on the left monitor and the second transformed information regarding the right image on the right monitor.

2. The stereoscopic image display apparatus as claimed in claim 1, wherein the memory means includes means for storing information regarding an array of two-dimensional left image segments forming the left image and information regarding an array of two-dimensional right image segments forming the right image.

3. The stereoscopic image display apparatus as claimed in claim 2, wherein the image transforming means includes a first buffer memory for storing information transferred thereto from the memory means, the transferred information regarding an array of adjacent left image segments forming a portion of the left image having a first specified data point, and a second buffer memory for storing information transferred thereto from the memory means, the transferred information regarding an array of adjacent right image segments forming a portion of the right image having a second specified data point corresponding to the first data point.

4. The stereoscopic image display apparatus as claimed in claim 3, wherein the image transforming means includes means for extracting information from the information stored in the first buffer memory, the extracted information regarding pixels included in a specified area of the information having the first data point at the center of the specified area, and means for extracting information from the information stored in the second buffer memory, the extracted information regarding pixels included in a specified area of the information having the second data point at the center of the specified area.

5. The stereoscopic image display apparatus as claimed in claim 4, wherein the image transforming means includes a first image memory for storing the extracted information transferred from the first buffer memory to form the first transformed information regarding an array of pixels having the first data point at the center of the array, and a second image memory for storing the extracted information transferred from the second buffer memory to form the second transformed information regarding an array of pixels having the second data point at the center of the array.

6. The stereoscopic image display apparatus as claimed in claim 5, wherein the display means includes marking means for displaying at least one first measure mark at a given first position on the first transformed information and at least one second measure mark at a second position on the second transformed information, the second position corresponding to the first position.

7. The stereoscopic image display apparatus as claimed in claim 6, wherein the marking means includes a first memory for storing first marking information including information regarding the first measure mark, and means for combining the first marking information transferred from the first memory with the first transformed information transferred from the first image memory, the marking means including a second memory for storing second marking information including information regarding the second measure mark, and means for combining the second marking information transferred from the second memory with the second transformed information transferred from the second image memory.

8. The stereoscopic image display apparatus as claimed in claim 5, wherein the image transforming means includes means for specifying a first pair of X and Y addresses identifying a location from which pixel information regarding a pixel is transferred from the first buffer memory, means for storing the transferred pixel information at a predetermined location identified by a second pair of X and Y addresses in the first image memory, and means for calculating the first pair of X and Y addresses from an equation for transforming the coordinate system of the left image to the transformed coordinate system, the equation defining the first pair of X and Y addresses as a function of the second pair of X and Y addresses, and wherein the image transforming means includes means for specifying a first pair of X and Y addresses identifying a location from which pixel information regarding a pixel is transferred from the second buffer memory, means for storing the transferred pixel information at a predetermined location identified by a second pair of X and Y addresses in the second image memory, and means for calculating the first pair of X and Y addresses from the equation for transforming the coordinate system of the right image to the transformed coordinate system.

9. The stereoscopic image display apparatus as claimed in claim 8, wherein the display means includes marking means for displaying at least one first measure mark at a given first position on the first transformed information and at least one second measure mark at a second position on the second transformed information, the second position corresponding to the first position.

10. The stereoscopic image display apparatus as claimed in claim 9, wherein the marking means includes a first memory for storing first marking information including information regarding the first measure mark, and means for combining the first marking information transferred from the first memory with the first transformed information transferred from the first image memory, and wherein the marking means including a second memory for storing second marking information including information regarding the second measure mark, and means for combining the second marking information transferred from the second memory with the second transformed information transferred from the second image memory.

11. The stereoscopic image display apparatus as claimed in claim 5, wherein the image transforming means includes means for specifying a first pair of X and Y addresses identifying a location from which pixel information regarding a pixel is transferred from the first buffer memory, means for storing the transferred pixel information at a predetermined location identified by a second pair of X and Y addresses in the first image memory, and means for calculating the first pair of X and Y addresses from a perspective projection equation for transforming the coordinate system of the left image to the transformed coordinate system, the equation defining the first pair of X and Y addresses as a function of the second pair of X and Y addresses, and wherein the image transforming means includes means for specifying a first pair of X and Y addresses identifying a location from which pixel information regarding a pixel is transferred from the second buffer memory, means for storing the transferred pixel information at a predetermined location identified by a second pair of X and Y addresses in the second image memory, and means for calculating the first pair of X and Y addresses from the perspective projection equation for transforming the coordinate system of the right image to the transformed coordinate system.

12. The stereoscopic image display apparatus as claimed in claim 11, wherein the display means includes marking means for displaying at least one first measure mark at a given first position on the first transformed information and at least one second measure mark at a second position on the second transformed information, the second position corresponding to the first position.

13. The stereoscopic image display apparatus as claimed in claim 12, wherein the marking means includes a first memory for storing first marking information including information regarding the first measure mark, and means for combining the first marking information transferred from the first memory with the first transformed information transferred from the first image memory, and wherein the marking means including a second memory for storing second marking information including information regarding the second measure mark, and means for combining the second marking information transferred from the second memory with the second transformed information transferred from the second image memory.

* * * * *